(12) United States Patent
Somakumar et al.

(10) Patent No.: US 8,484,613 B2
(45) Date of Patent: Jul. 9, 2013

(54) OPTIMIZING BOUNDS CHECKING USING COMPUTER ALGEBRA

(75) Inventors: Harikumar Somakumar, Pleasanton, CA (US); Jimin Wang, Shanghai (CN)

(73) Assignee: Synopsys, Inc., Mountain View, CA (US)

( * ) Notice: Subject to any disclaimer, the term of this patent is extended or adjusted under 35 U.S.C. 154(b) by 664 days.

(21) Appl. No.: 12/695,908

(22) Filed: Jan. 28, 2010

(65) Prior Publication Data

US 2011/0185341 A1     Jul. 28, 2011

(51) Int. Cl.
    *G06F 9/44*     (2006.01)
(52) U.S. Cl.
    USPC .......................................... 717/110; 717/158
(58) Field of Classification Search
    USPC .................. 717/110, 111, 130, 158
    See application file for complete search history.

(56) References Cited

U.S. PATENT DOCUMENTS

| | | | | |
|---|---|---|---|---|
| 5,583,988 | A * | 12/1996 | Crank et al. | 714/48 |
| 6,665,864 | B1 * | 12/2003 | Kawahito et al. | 717/151 |
| 7,840,950 | B2 * | 11/2010 | Stoodley et al. | 717/151 |
| 8,051,226 | B2 * | 11/2011 | Moyer | 710/52 |
| 8,131,532 | B2 * | 3/2012 | Cadambi et al. | 703/22 |
| 2007/0153001 | A1 * | 7/2007 | Yu et al. | 345/440 |
| 2010/0162220 | A1 * | 6/2010 | Cui et al. | 717/155 |

OTHER PUBLICATIONS

Rajiv Gupta, "Optimizing Array Bound Checks Using Flow Analysis", 1993.*
Nguyen et al., "Efficient and Effective Array Bound Checking", 2005.*
Wurthinger et al., "Array Bounds Check Elimination for the Java HotSpotTM Client Compiler", 2007.*
A.D. Dimarogonas, "Interval Analysis of Vibrating Systems", 1995.*
Havlak et al., "An Implementation of Interprocedural Bounded Regular Section Analysis", 1991.*

\* cited by examiner

*Primary Examiner* — Phillip H Nguyen
(74) *Attorney, Agent, or Firm* — Park, Vaughan, Fleming & Dowler; Laxman Sahasrabuddhe

(57) ABSTRACT

Some embodiments of the present invention provide techniques and systems for optimizing bounds-checking During operation, the system can receive one or more instructions which when executed evaluate a first expression whose value is required to be between a lower bound expression's value and an upper bound expression's value, such that at least one of the following three values is not determinable before execution: the first expression's value, the lower bound expression's value, and the upper bound expression's value. Next, the system can use computer algebra to determine whether the first expression's value is guaranteed to be between the lower bound expression's value and the upper bound expression's value. If the system determines that the first expression's value is not guaranteed to be between the lower bound expression's value and the upper bound expression's value, the system can add bounds-checking instructions to the one or more instructions.

21 Claims, 4 Drawing Sheets

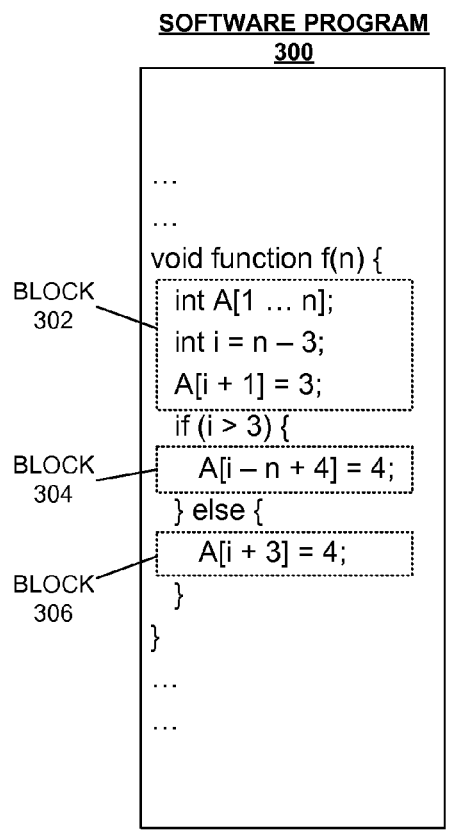
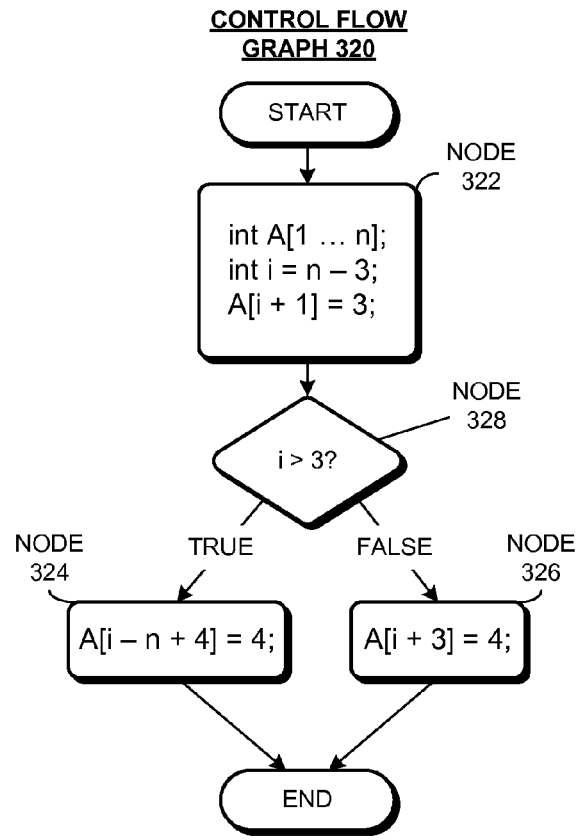
FIG. 3A
FIG. 3B
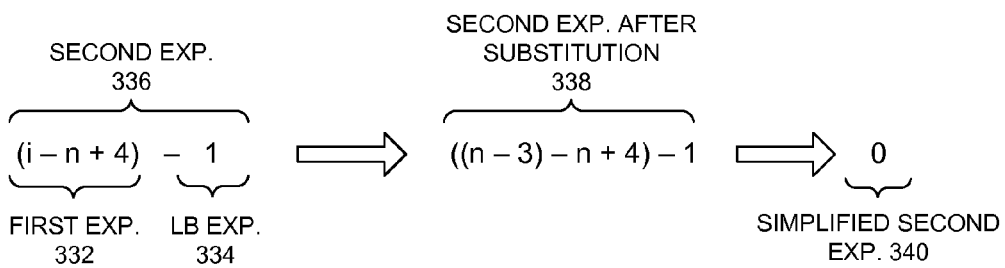
FIG. 3C

OPTIMIZING BOUNDS CHECKING USING COMPUTER ALGEBRA

BACKGROUND

1. Technical Field

The present disclosure generally relates to computer systems. More specifically, this disclosure relates to optimizing bounds checking using computer algebra.

2. Related Art

Programming languages often use constructs which are indexed by a value. For example, most programming languages include an array construct which stores a sequence of elements that can be accessed by using an index value.

Note that the index value is valid only when it is within a specified range of values. If a system accesses an element using an index value that is outside the valid range, the system can malfunction. Specifically, using an invalid index value to read an element will return garbage, and using an invalid index value to write an element can corrupt memory.

Note that the problem of bounds checking is not limited to arrays or other indexed data structures. In general, to ensure that a piece of code executes correctly, we may need to ensure that certain variables, parameters, and/or arguments are within a range of values. For example, a function may generate correct results only if the function's arguments fall within a certain range of values.

Bounds-checking instructions can be added to a piece of code to ensure that variables, parameters, and/or arguments do not violate their respective bounds during runtime. Unfortunately, bounds-checking instructions can significantly increase the runtime overhead. For example, if the bounds-checking instructions are executed each time a loop variable is incremented, it can significantly increase runtime.

Hence, what is needed are techniques and systems for optimizing bounds checking

SUMMARY

Some embodiments of the present invention provide techniques and systems for optimizing bounds checking During operation, the system can receive one or more instructions which when executed evaluate a first expression whose value is required to be between a lower bound expression's value and an upper bound expression's value, such that at least one of the following three values is not determinable before execution: the first expression's value, the lower bound expression's value, and the upper bound expression's value. Note that bounds-checking instructions would not be required if we could determine all three values at compile time because we would know whether the bounds are going to be violated or not.

Next, the system can use computer algebra to determine whether the first expression's value is guaranteed to be between the lower bound expression's value and the upper bound expression's value.

If the system determines that the first expression's value is not guaranteed to be between the lower bound expression's value and the upper bound expression's value, the system can add bounds-checking instructions to the one or more instructions. During execution, the bounds-checking instructions can determine whether the first expression's value is between the lower bound expression's value and the upper bound expression's value.

On the other hand, if the system determines, by using computer algebra, that the first expression's value is guaranteed to be between the lower bound expression's value and the upper bound expression's value, the system does not add bounds-checking instructions, thereby reducing the bounds-checking overhead.

In some embodiments, the system can determine whether the first expression's value is guaranteed to be between the lower bound expression's value and the upper bound expression's value as follows. First, the system can construct a second expression which represents a difference between the first expression and the lower bound expression. Next, the system can use computer algebra to simplify the second expression to obtain a simplified second expression. The system can then compare the simplified second expression with zero to determine whether the first expression's value is guaranteed to be greater than or equal to the lower bound expression's value. Next, the system can construct a third expression which represents a difference between the first expression and the upper bound expression. The system can then use computer algebra to simplify the third expression to obtain a simplified third expression. Next, the system can compare the simplified third expression with zero to determine whether the first expression's value is guaranteed to be less than or equal to the upper bound expression's value. Note that the sequence in which the bounds are checked can be reversed, i.e., the system can first check whether the first expression is guaranteed to be less than or equal to the upper bound, and then check whether the first expression is guaranteed to be greater than or equal to the lower bound.

In some embodiments, the system can construct the second expression and/or the third expression as follows. The system can determine a control flow graph using the one or more instructions. Next, the system can determine the second expression by iteratively replacing variables in the first expression and/or the lower bound expression with equivalent expressions using the control flow graph. This iterative replacement process can terminate when no more substitutions are possible or when the first expression uses the same variables as the lower bound expression. The system can similarly determine the third expression by iteratively replacing variables in the first expression and/or the upper bound expression with equivalent expressions using the control flow graph. This iterative replacement process can terminate when no more substitutions are possible or when the first expression uses the same variables as the upper bound expression.

In some embodiments, the one or more instructions may use the first expression's value to access an element in an indexed data structure. In these embodiments, the lower bound expression and the upper bound expression can define a valid range of index values for the indexed data structure.

BRIEF DESCRIPTION OF THE FIGURES

FIGS. 3A and 3B illustrate how a control flow graph can be determined for a software program in accordance with an embodiment of the present invention.

FIG. 3C illustrates how a control flow graph can be used for constructing an expression in accordance with some embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
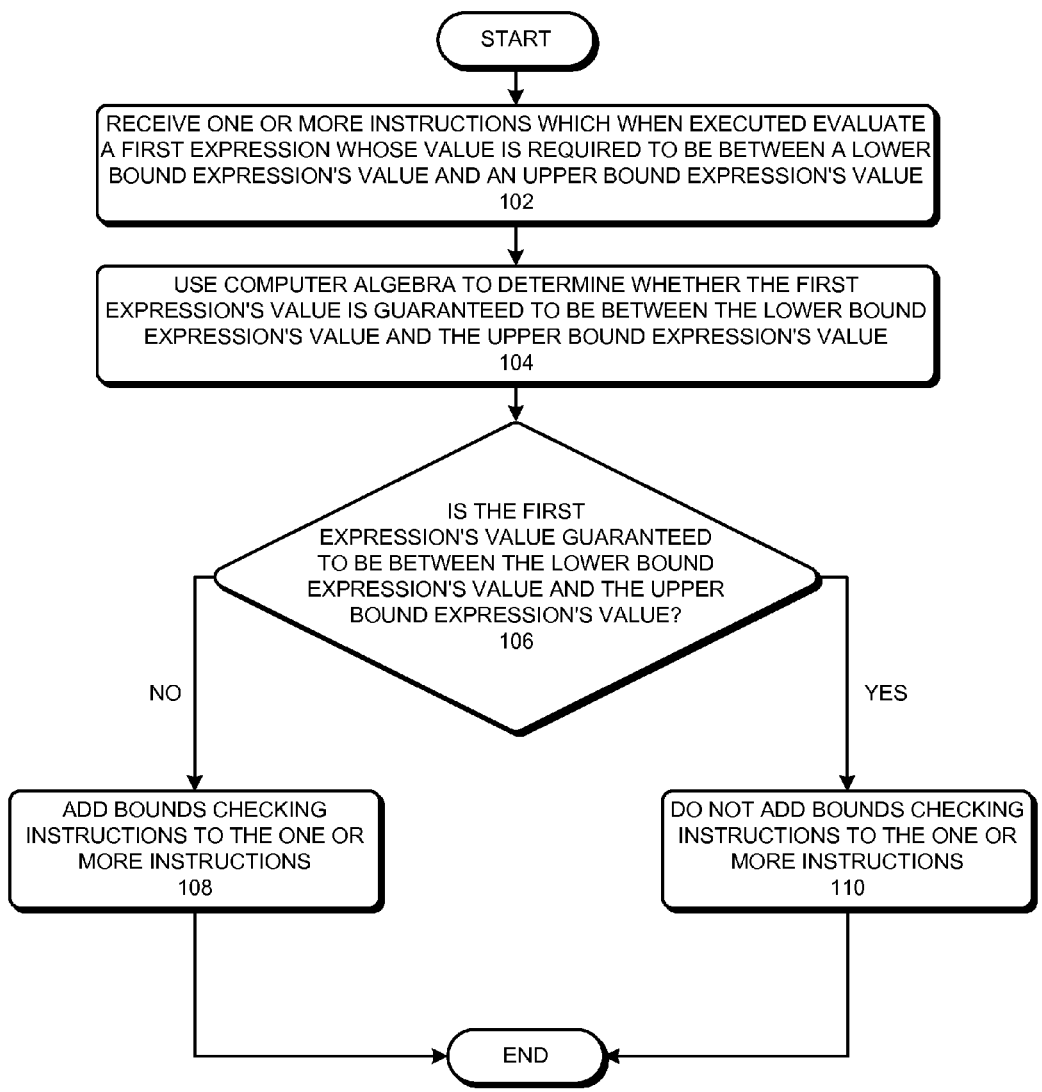
FIG. 1 presents a flowchart which illustrates a process for adding bounds-checking instructions in accordance with an embodiment of the present invention.

FIG. 1 presents a flowchart which illustrates a process for adding bounds-checking instructions in accordance with some embodiments of the present invention.

The process can begin by receiving one or more instructions which when executed evaluate a first expression whose value is required to be between a lower bound expression's value and an upper bound expression's value (step 102). Note that at least one of the following three values is not determinable before execution: the first expression's value, the lower bound expression's value, or the upper bound expression's value.

Next, the system can use computer algebra to determine whether the first expression's value is guaranteed to be between the lower bound expression's value and the upper bound expression's value (step 104).

Note that the term "computer algebra" is a well-known term of art which relates to techniques and systems for symbolically manipulating mathematical expressions. A number of computer algebra systems are available in the industry. Further details on computer algebra can be found in standard texts such as Joachim von zur Gathen, *Modern Computer Algebra*, $2^{nd}$ ed., Cambridge University Press, 2003.

If the first expression's value is not guaranteed to be between the lower bound expression's value and the upper bound expression's value (NO branch of step 106), the system can add bounds-checking instructions to the one or more instructions (step 108).

On the other hand, if the first expression's value is guaranteed to be between the lower bound expression's value and the upper bound expression's value (YES branch of step 106), the system does not add bounds-checking instructions to the one or more instructions (step 110), thereby reducing the bounds-checking overhead.

Figure 2:
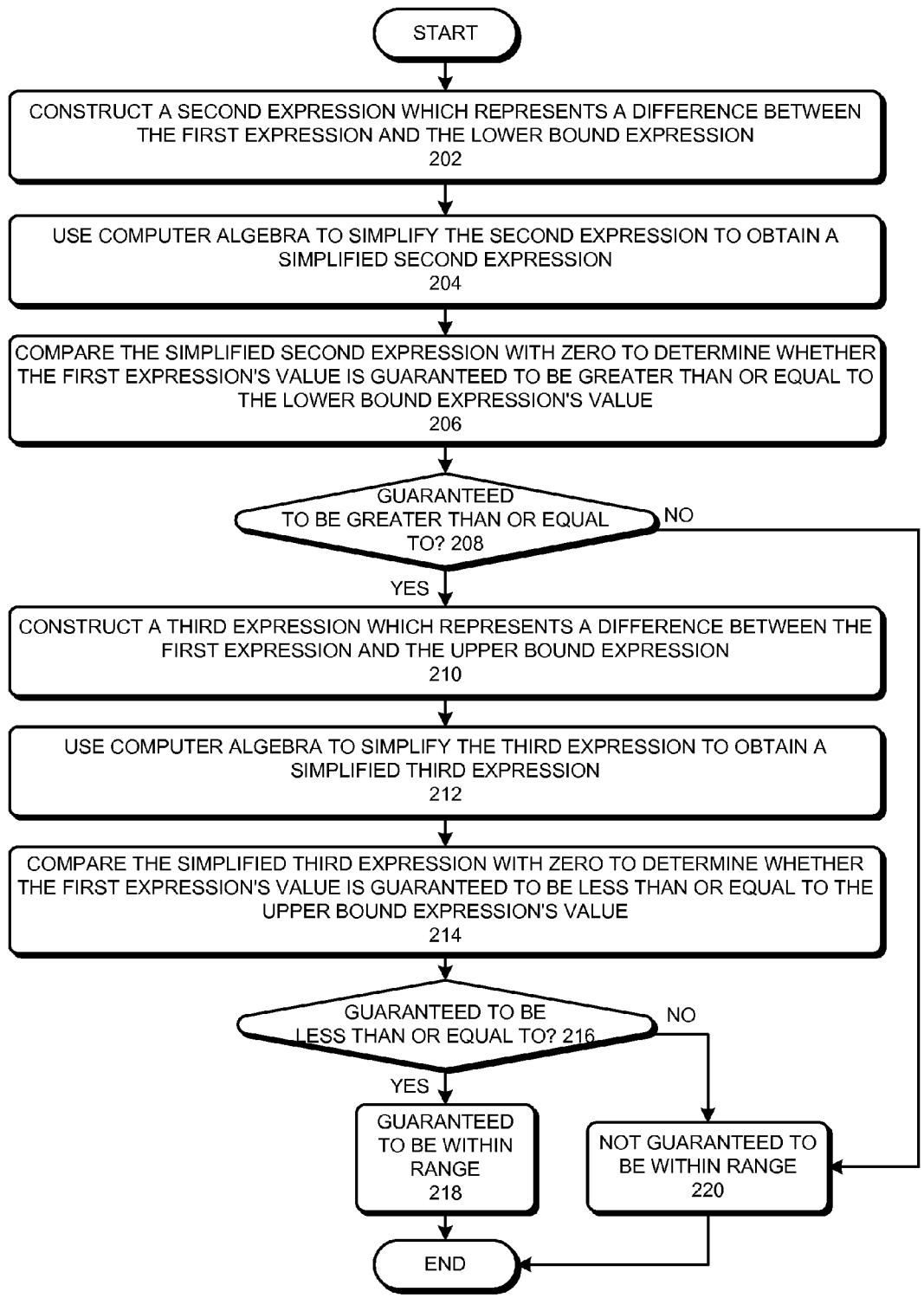
FIG. 2 presents a flowchart which illustrates a process for determining whether a first expression's value is guaranteed to be between a lower bound expression's value and an upper bound expression's value in accordance with some embodiments of the present invention.

FIG. 2 presents a flowchart which illustrates a process for determining whether a first expression's value is guaranteed to be between a lower bound expression's value and an upper bound expression's value in accordance with some embodiments of the present invention.

The process can begin by constructing a second expression which represents a difference between the first expression and the lower bound expression (step 202). Next, the system can use computer algebra to simplify the second expression to obtain a simplified second expression (step 204). The system can then compare the simplified second expression with zero to determine whether the first expression's value is guaranteed to be greater than or equal to the lower bound expression's value (step 206).

If the first expression's value is not guaranteed to be greater than or equal to the lower bound expression's value ("NO" branch of step 208), the system can determine that the first expression's value is not guaranteed to be between a lower bound expression's value and an upper bound expression's value (step 220). On the other hand, if the first expression's value is guaranteed to be greater than or equal to the lower bound expression's value ("YES" branch of step 208), the system can then check if the first expression's value is guaranteed to be less than or equal to the upper bound expression's value as explained below.

The system can construct a third expression which represents a difference between the first expression and the upper bound expression (step 210). Next, the system can use computer algebra to simplify the third expression to obtain a simplified third expression (step 212). The system can then compare the simplified third expression with zero to determine whether the first expression's value is guaranteed to be less than or equal to the upper bound expression's value (step 214).

If the first expression's value is not guaranteed to be less than or equal to the upper bound expression's value ("NO" branch of step 216), the system can determine that the first expression's value is not guaranteed to be between a lower bound expression's value and an upper bound expression's value (step 220). On the other hand, if the first expression's value is guaranteed to be less than or equal to the upper bound expression's value ("YES" branch of step 216), the system can then determine that the first expression's value is guaranteed to be between a lower bound expression's value and an upper bound expression's value (step 218).

The system can use a control flow graph to construct the second expression and the third expression. A control flow graph is a representation of execution paths in a software program that may be followed during execution. Note that a control flow graph is sometimes referred to as a flow graph. Control flow graphs are widely used for software analysis and optimization. Further details on control flow graphs can be found in Alfred V. Aho, Monica S. Lam, Ravi Sethi, and Jeffrey D. Ullman, *Compilers: Principles, Techniques, and Tools*, $2^{nd}$ ed., Addison Wesley, 2006.

The system can construct the second expression, which represents a difference between the first expression and the lower bound expression, by iteratively replacing variables in the first expression and/or the lower bound expression with equivalent expressions using the control flow graph until no more substitutions are possible or until the first expression uses the same variables as the lower bound expression.

Similarly, the system can construct the third expression, which represents a difference between the first expression and the upper bound expression, by iteratively replacing variables in the first expression and/or the upper bound expression with equivalent expressions using the control flow graph until no more substitutions are possible or until the first expression uses the same variables as the upper bound expression.

FIGS. 3A and 3B illustrate how a control flow graph can be determined for a software program in accordance with an embodiment of the present invention.

Software program 300 shown in FIG. 3A includes instructions that define function "f(n)." These instructions can be grouped into blocks 302, 304, and 306. Each block includes a set of instructions that are performed in a sequence, e.g., without any branches. The truth value of the branch statement "if (i>3)" determines whether instructions in block 304 are executed or instructions in block 306 are executed.

Control flow graph 320 shown in FIG. 3B can be created based on the instructions of software program 300. Each block of instructions in software program 300 corresponds to a node in control flow graph 320. Specifically, blocks 302, 304, and 306 correspond to nodes 322, 324, and 326, respectively. The branch statement "if (i>3)" in software program 300 is represented by node 328. The edge between nodes 328 and 324 corresponds to the "TRUE" branch of the "if" statement, and the edge between nodes 328 and 326 corresponds to the "FALSE" branch of the "if" statement.

Control flow graph 320 can be used for performing iterative substitutions. To replace a variable with an equivalent expression, the system can trace back to the start node of the control flow graph. Along the path to the start node, the system can check whether an assignment has been made to the variable. If so, the system can replace the variable with the right-hand side of the assignment. For example, to replace the variable i in the expression "(i−n+4)" in node 324, the system can trace back till it reaches the assignment statement "i=n−3" in node 322. Next, the system can replace the variable i with the expression "(n−3)."

FIG. 3C illustrates how a control flow graph can be used for constructing an expression in accordance with some embodiments of the present invention.

The expression "(i−n+4)" is evaluated in block 304 of software program 300. The value of this expression is then used for accessing an array element in array A. Array A's definition in block 302 specifies that valid index values for array A range from 1 to n. In other words, the lower bound expression is 1 and the upper bound expression is n.

Second expression 336 represents a difference between first expression 332 and lower bound expression 334. The system can iteratively replace the variables in first expression 332 and lower bound expression 334 until no more substitutions are possible to obtain expression 338. The system can then use computer algebra to simplify expression 338 to obtain simplified second expression 340. Next, the system can compare simplified second expression 340 with zero to determine whether first expression 332's value is guaranteed to be greater than or equal to lower bound expression 334's value. Since simplified second expression 340 is equal to zero, first expression 332's value is guaranteed to be equal to lower bound expression 334's value. Hence, in this case, the system may decide not to add bounds-checking instructions.

As another example, consider the following VHDL code snippet:

```
Function (... N: integer)
   Variable X : std_logic_vector (1 to N);
   K := N/2 − 1;
   For I in 1 to K loop
      X(2 * I + 1) := 4;
   End loop;
```

Some embodiments of the present invention can determine whether the index value that is used to access vector X is guaranteed to be within the valid range of values. Specifically, to compare expression "2*I+1" with the lower bound, the system can replace variable I with 1 because the loop variable I goes from 1 to K. By replacing I with 1, the system obtains the expression "3," which is guaranteed to be greater than 1, which is the lower bound of vector X. In other words, the lower bound will not be violated.

Similarly, to compare expression "2*I+1" with the upper bound, the system can replace variable I with K because the loop variable I goes from 1 to K. By replacing variable I with K, the system obtains the expression "2*K+1." Next, the system can use the control flow graph for the VHDL code snippet to replace K with the equivalent expression "N/2−1" to obtain the expression "2*(N/2−1)+1." The system can then use computer algebra to simplify this expression to obtain expression "N−1." Note that the expression "N−1" is guaranteed to be less than N. In other words, the upper bound will not be violated.

Hence, for the VHDL code snippet shown above, the system can determine that the index value is guaranteed to be within the valid range of values, and can therefore decide not to add bounds-checking instructions.

Figure 4:
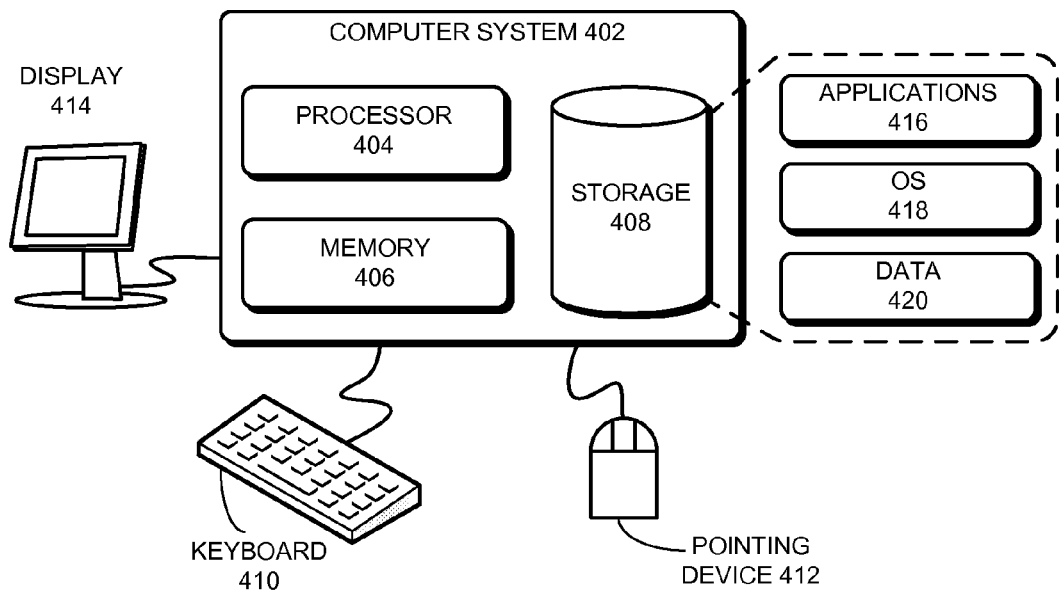
FIG. 4 illustrates a computer system in accordance with some embodiments of the present invention.

FIG. 4 illustrates a computer system in accordance with some embodiments of the present invention.

A computer or computer system can generally be any system that can perform computations. Specifically, a computer can be a microprocessor-based system which may include multiple processing cores, a network-processor-based system, a digital-signal-processor-based system, a portable computing device, a personal organizer, a distributed-computing-platform-based system, or any other computing system now known or later developed.

Computer system 402 comprises processor 404, memory 406, and storage 408. Computer system 402 can be coupled with display 414, keyboard 410, and pointing device 412. Storage 408 can generally be any device that can store data. Specifically, a storage device can be a magnetic, an optical, or a magneto-optical storage device, or it can be based on flash memory and/or battery-backed up memory. Storage 408 can store applications 416, operating system 418, and data 420.

Applications 416 can include instructions that when executed by computer 402 cause computer 402 to perform one or more processes described in this disclosure. Data 420 can include source code, compiled code, expressions, and/or any other data that is inputted or outputted by one or more processes described in this disclosure.

Figure 5:
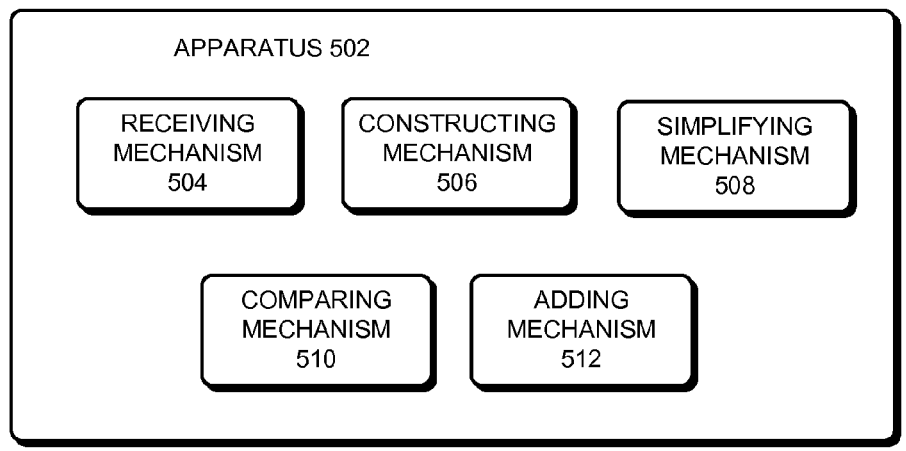
FIG. 5 illustrates an apparatus in accordance with some embodiments of the present invention.

FIG. 5 illustrates an apparatus in accordance with some embodiments of the present invention.

Apparatus 502 can comprise a number of mechanisms which may communicate with one another via a wired or wireless communication channel. Apparatus 502 may be realized using one or more integrated circuits. Apparatus 502 may be integrated with a computer system, or it may be realized as a separate device which is capable of communicating with other computer systems and/or devices. Apparatus 502 may include more or fewer mechanisms than those shown in FIG. 5.

In some embodiments, apparatus 502 can comprise receiving mechanism 504, constructing mechanism 506, simplifying mechanism 508, comparing mechanism 510, and adding mechanism 512. Receiving mechanism 504 can be configured to receive one or more instructions which when executed evaluate a first expression whose value is required to be between a lower bound expression's value and an upper bound expression's value. Constructing mechanism 506 can be configured to construct a second expression which represents a difference between the first expression and the lower bound expression and/or a third expression which represents a difference between the first expression and the upper bound expression. Simplifying mechanism 508 can be configured to use computer algebra to simplify the second or third expression to obtain a simplified second or third expression. Comparing mechanism 510 can be configured to compare the simplified second and third expression with zero to determine whether the first expression's value is guaranteed to be within the lower bound expression's value and the upper bound expression's value. Adding mechanism 512 can be configured to add bounds-checking instructions if the first expression's value is not guaranteed to be within the lower bound expression's value and the upper bound expression's value.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for adding bounds-checking instructions, the method comprising:
   receiving one or more instructions which when executed evaluate a first expression whose value is required to be between a lower bound expression's value and an upper bound expression's value, wherein at least one of the first expression's value, the lower bound expression's value, or the upper bound expression's value is not determinable before execution of the one or more instructions;
   in response to determining, using computer algebra, that the first expression's value is not guaranteed to be between the lower bound expression's value and the upper bound expression's value, adding bounds-checking instructions to the one or more instructions, wherein during execution of the one or more instructions, the bounds-checking instructions determine whether the first expression's value is between the lower bound expression's value and the upper bound expression's value; and
   in response to determining, using computer algebra, that the first expression's value is guaranteed to be between the lower bound expression's value and the upper bound expression's value, not adding bounds-checking instructions to the one or more instructions.

2. The method of claim 1, wherein determining, using computer algebra, that the first expression's value is not guaranteed to be between the lower bound expression's value and the upper bound expression's value includes:
   constructing a second expression which represents a difference between the first expression and the lower bound expression;
   using computer algebra to simplify the second expression to obtain a simplified second expression; and
   comparing the simplified second expression with zero to determine whether the first expression's value is guaranteed to be greater than or equal to the lower bound expression's value.

3. The method of claim 2, wherein constructing the second expression includes:
   determining a control flow graph using the one or more instructions; and
   using the control flow graph to iteratively replace variables in the first expression and the lower bound expression with equivalent expressions until no more substitutions are possible or until the first expression uses the same variables as the lower bound expression.

4. The method of claim 1, wherein determining, using computer algebra, that the first expression's value is not guaranteed to be between the lower bound expression's value and the upper bound expression's value includes:
   constructing a third expression which represents a difference between the first expression and the upper bound expression;
   using computer algebra to simplify the third expression to obtain a simplified third expression; and
   comparing the simplified third expression with zero to determine whether the first expression's value is guaranteed to be less than or equal to the upper bound expression's value.

5. The method of claim 4, wherein constructing the third expression includes:
   determining a control flow graph using the one or more instructions; and
   using the control flow graph to iteratively replace variables in the first expression and the upper bound expression with equivalent expressions until no more substitutions are possible or until the first expression uses the same variables as the upper bound expression.

6. The method of claim 1, wherein the one or more instructions use the first expression's value to access an element in an indexed data structure.

7. The method of claim 6, wherein the lower bound expression and the upper bound expression define a valid range of index values for the indexed data structure.

8. A non-transitory computer-readable storage medium storing instructions that when executed by a computer cause the computer to perform a method for adding bounds-checking instructions, the method comprising:
   receiving one or more instructions which when executed evaluate a first expression whose value is required to be between a lower bound expression's value and an upper bound expression's value, wherein at least one of the first expression's value, the lower bound expression's value, or the upper bound expression's value is not determinable before execution;
   in response to determining, using computer algebra, that the first expression's value is not guaranteed to be between the lower bound expression's value and the upper bound expression's value, adding bounds-checking instructions to the one or more instructions, wherein during execution of the one or more instructions, the bounds-checking instructions determine whether the first expression's value is between the lower bound expression's value and the upper bound expression's value; and in response to determining, using computer algebra, that the first expression's value is guaranteed to be between the lower bound expression's value and the upper bound expression's value, not adding bounds-checking instructions to the one or more instructions.

9. The non-transitory computer-readable storage medium of claim 8, wherein determining, using computer algebra, that the first expression's value is not guaranteed to be between the lower bound expression's value and the upper bound expression's value includes:

constructing a second expression which represents a difference between the first expression and the lower bound expression;

using computer algebra to simplify the second expression to obtain a simplified second expression; and comparing the simplified second expression with zero to determine whether the first expression's value is guaranteed to be greater than or equal to the lower bound expression's value.

10. The non-transitory computer-readable storage medium of claim 9, wherein constructing the second expression includes:

determining a control flow graph using the one or more instructions; and using the control flow graph to iteratively replace variables in the first expression and the lower bound expression with equivalent expressions until no more substitutions are possible or until the first expression uses the same variables as the lower bound expression.

11. The non-transitory computer-readable storage medium of claim 8, wherein determining, using computer algebra, that the first expression's value is not guaranteed to be between the lower bound expression's value and the upper bound expression's value includes:

constructing a third expression which represents a difference between the first expression and the upper bound expression;

using computer algebra to simplify the third expression to obtain a simplified third expression; and comparing the simplified third expression with zero to determine whether the first expression's value is guaranteed to be less than or equal to the upper bound expression's value.

12. The non-transitory computer-readable storage medium of claim 11, wherein constructing the third expression includes:

determining a control flow graph using the one or more instructions; and using the control flow graph to iteratively replace variables in the first expression and the upper bound expression with equivalent expressions until no more substitutions are possible or until the first expression uses the same variables as the upper bound expression.

13. The non-transitory computer-readable storage medium of claim 8, wherein the one or more instructions use the first expression's value to access an element in an indexed data structure.

14. The non-transitory computer-readable storage medium of claim 13, wherein the lower bound expression and the upper bound expression define a valid range of index values for the indexed data structure.

15. An apparatus for adding bounds-checking instructions, comprising:

a processor; and a storage medium storing processor-instructions that are capable of being executed by the processor, wherein the instructions comprise:

processor-instructions to receive a set of instructions which when executed evaluate a first expression whose value is required to be between a lower bound expression's value and an upper bound expression's value, wherein at least one of the first expression's value, the lower bound expression's value, or the upper bound expression's value is not determinable before execution; and processor-instructions to add bounds-checking instructions to the one or more instructions in response to determining, using computer algebra, that the first expression's value is not guaranteed to be between the lower bound expression's value and the upper bound expression's value, wherein during execution of the one or more instructions, the bounds-checking instructions determine whether the first expression's value is between the lower bound expression's value and the upper bound expression's value; and in response to determining, using computer algebra, that the first expression's value is guaranteed to be between the lower bound expression's value and the upper bound expression's value, not adding bounds-checking instructions to the one or more instructions.

16. The apparatus of claim 15, wherein the processor-instructions further comprise:

processor-instructions to construct a second expression which represents a difference between the first expression and the lower bound expression;

processor-instructions to use computer algebra to simplify the second expression to obtain a simplified second expression; and processor-instructions to compare the simplified second expression with zero to determine whether the first expression's value is guaranteed to be greater than or equal to the lower bound expression's value.

17. The apparatus of claim 16, wherein the processor-instructions further comprise:

processor-instructions to determine a control flow graph using the one or more instructions; and processor-instructions to use the control flow graph to iteratively replace variables in the first expression and the lower bound expression with equivalent expressions until no more substitutions are possible or until the first expression uses the same variables as the lower bound expression.

18. The apparatus of claim 16, wherein the processor-instructions further comprise:

processor-instructions to construct a third expression which represents a difference between the first expression and the upper bound expression;

processor-instructions to use computer algebra to simplify the third expression to obtain a simplified third expression; and processor-instructions to compare the simplified third expression with zero to determine whether the first expression's value is guaranteed to be less than or equal to the upper bound expression's value.

19. The apparatus of claim 18, wherein the processor-instructions further comprise:

processor-instructions to determine a control flow graph using the one or more instructions; and processor-instructions to use the control flow graph to iteratively replace variables in the first expression and the upper bound expression with equivalent expressions until no more substitutions are possible or until the first expression uses the same variables as the upper bound expression.

20. The apparatus of claim 15, wherein the one or more instructions use the first expression's value to access an element in an indexed data structure.

21. The apparatus of claim 20, wherein the lower bound expression and the upper bound expression define a valid range of index values for the indexed data structure.

* * * * *